United States Patent
Linnell

(10) Patent No.: US 10,191,560 B2
(45) Date of Patent: *Jan. 29, 2019

(54) THROTTLE FUNCTIONALITY OF HAPTIC CONTROLLER

(71) Applicant: Verily Life Sciences LLC, Mountain View, CA (US)

(72) Inventor: Jeffrey Linnell, Woodside, CA (US)

(73) Assignee: Verily Life Sciences LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/722,937

(22) Filed: Oct. 2, 2017

(65) Prior Publication Data

US 2018/0024516 A1  Jan. 25, 2018

Related U.S. Application Data

(63) Continuation of application No. 14/968,535, filed on Dec. 14, 2015, now Pat. No. 9,811,066.

(51) Int. Cl.
| | |
|---|---|
| *G06F 3/02* | (2006.01) |
| *G06F 3/0362* | (2013.01) |
| *G06F 3/01* | (2006.01) |
| *G06F 3/0488* | (2013.01) |
| *G06F 3/0354* | (2013.01) |

(52) U.S. Cl.
CPC ............... *G06F 3/02* (2013.01); *G06F 3/016* (2013.01); *G06F 3/0362* (2013.01); *G06F 3/03547* (2013.01); *G06F 3/0488* (2013.01); *Y10S 901/02* (2013.01)

(58) Field of Classification Search
CPC . G05B 15/02; G06F 3/016; G06F 3/02; G06F 3/0362; Y10S 901/02

USPC ........................................................ 345/184
See application file for complete search history.

(56) References Cited

U.S. PATENT DOCUMENTS

| | | | |
|---|---|---|---|
| 4,002,043 | A | 1/1977 | Yoshida |
| 5,004,391 | A | 4/1991 | Burdea |
| 5,129,283 | A | 7/1992 | Koehler |
| 5,587,937 | A | 12/1996 | Massie et al. |
| 6,371,890 | B1 | 4/2002 | Schell |
| 6,586,860 | B1 | 7/2003 | Iino et al. |
| 6,833,846 | B2 | 12/2004 | Hasser |

(Continued)

FOREIGN PATENT DOCUMENTS

JP  2005068935  3/2005

OTHER PUBLICATIONS

Badescu, Mircea; Wampler, Charles; Mavroidis, Constantino; "Rotary Haptic Knob for Vehicular Instrument Controls"; Proceedings of the 10th Symp. on Haptic Interfaces for Virtual Envir. & Teleoperator Systs. (HAPTICS'02), IEEE, 2002, 2 pages.

(Continued)

*Primary Examiner* — Stephen G Sherman
(74) *Attorney, Agent, or Firm* — McDonnell Boehnen Hulbert & Berghoff LLP

(57) ABSTRACT

Example implementations may relate to a haptic hand-holdable controller configured with throttle functionality. An example device may take the form of a haptic controller, which senses tactile information and provides force feedback. The haptic hand-holdable controller may implement a throttle where a motor varies feedback to the hand-holdable controller to simulate a throttle.

20 Claims, 11 Drawing Sheets

(56) References Cited

U.S. PATENT DOCUMENTS

| | | |
|---|---|---|
| 6,978,694 B2 | 12/2005 | Peppard |
| 8,226,484 B2 | 7/2012 | Bryant et al. |
| 8,531,392 B2 | 9/2013 | Branton et al. |
| 9,069,396 B2 | 6/2015 | Adler et al. |
| 9,811,066 B1 * | 11/2017 | Linnell .................. G05B 15/02 |
| 2002/0036622 A1 | 3/2002 | Jaeger |
| 2003/0076297 A1 | 4/2003 | Hasser |
| 2004/0257339 A1 | 12/2004 | Takahashi |
| 2007/0236450 A1 | 10/2007 | Colgate et al. |
| 2009/0009491 A1 | 1/2009 | Crivna |
| 2010/0053691 A1 | 3/2010 | Kuyper-Hammond et al. |
| 2016/0089212 A1 | 3/2016 | Balicki et al. |

OTHER PUBLICATIONS

Kickstarter, "Spin remote—The Simplest, most Stylish remote ever", Dec. 2, 2014, <https://www.kickstarter.com/projects/spinremotelspin-remote-the-simplest-most-personal-remote-ever>.

\* cited by examiner

THROTTLE FUNCTIONALITY OF HAPTIC CONTROLLER

CROSS-REFERENCE TO RELATED APPLICATION

This application is a continuation of U.S. patent application Ser. No. 14/968,535, filed on Dec. 14, 2015, which is incorporated herein by reference in its entirety and for all purposes.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in controllers, sensing techniques, as well as component design and assembly.

SUMMARY

Example implementations may relate to a controller system that includes a rotatable knob having one or more touch sensors and an inertial measurement unit. With this arrangement, the controller system may be configured such that a throttle grip on the touch sensors, in combination with a horizontal orientation of the controller, loads a throttle operational mode onto the controller. The throttle operational mode may include both controller functionality, such as a return-to-center function, and configurable controller output (e.g., rotation of the knob and touch data received from the touch sensors may generate input data that represents intended control actions provided by a user holding the controller.

In one aspect, a controller system is provided. The controller system includes a rotatable knob coupled to a base. The controller system also includes at least one motor that is operable to apply a torque-generating force to the rotatable knob and one or more touch sensors arranged to sense touch input on a surface of the rotatable knob. The controller system also includes a control system configured to detect throttle mode input and operate the controller in a throttle mode, where the throttle mode includes operating the at least one motor to affect the rotation of the rotatable knob to simulate a throttle.

In another aspect, a method is provided. The method includes detecting a throttle mode input on a haptic controller, where the haptic controller includes a rotatable knob coupled to a base, at least one motor that is operable to apply a torque-generating force to the rotatable knob, and one or more touch sensors arranged to sense touch input on a surface of the rotatable knob. The method also includes operating the at least one motor to affect the rotation of the rotatable knob in a throttle mode to simulate a throttle.

In another aspect, a method is provided. The method includes detecting a throttle mode input on a haptic controller, where the haptic controller includes a rotatable knob coupled to a base, at least one motor that is operable to apply a torque-generating force to the rotatable knob, and one or more touch sensors arranged to sense touch input on a surface of the rotatable knob. The method includes, in response to detecting the throttle mode input, setting an initial position of the knob in relation to the base. The method includes detecting a movement of the knob in relation to the base and operating the at least one motor to return the knob to the initial position.

These as well as other aspects, advantages, and alternatives will become apparent to those of ordinary skill in the art by reading the following detailed description, with reference where appropriate to the accompanying drawings.

DETAILED DESCRIPTION

Figure 1A:
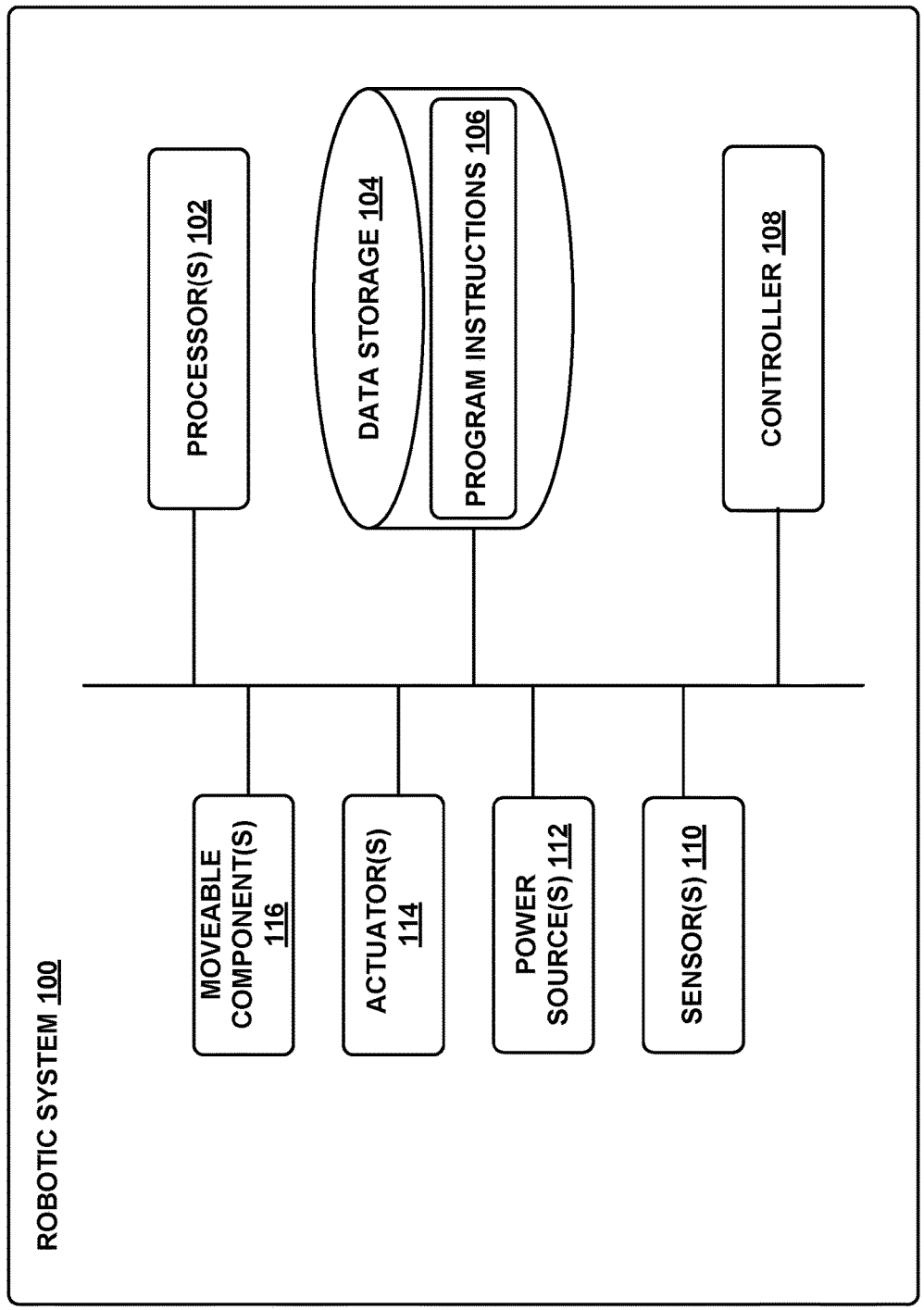
FIGS. 1A and 1B illustrate an example robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein is a controller system having a throttle mode. In particular, an example embodiment may involve a hand-holdable controller that includes a knob as well as touch sensors (e.g., a curved touchpad) coupled to the rotatable knob. Rotation of the knob and touch data received from the touch sensors may collectively generate input data that represents intended control actions provided by a user holding the controller. Further, a motor may be configured to apply torque-generating force to the knob, so as to provide haptic feedback. The controller system may be configured to detect a throttle mode input (e.g., the controller detects its orientation is horizontal and receives a touch input, such as a throttle grip). In response to detecting a throttle mode input, the controller system may operate in a throttle mode where, for example, the motor is configured to only allow rotation of the knob through some predetermined angle. In another aspect of throttle mode, the controller system may return the knob to its original position when released (e.g., like a throttle on a motorcycle).

A computing device, such as a tablet, may receive input data from the controller and may interpret the input data to determine specific intended operations of a robotic system. Upon processing the input data to determine a particular interpretation, the computing device may send commands to a robotic system (or to another device) in order to cause the robotic system to carry out intended operations of various components such as actuators coupled to joints, end effectors, appendages, speakers, and/or light sources, among others.

In some implementations, the throttle mode may include a return to center function. For example, the control system may apply a return-to-center function, e.g., with a constant torque-generating force, immediately upon detecting movement and in the opposite direction of movement (e.g., such that a user feels a constant back-pressure against rotation of the knob during rotation) until the knob returns to the center (or initial) position. Similarly, the control system may apply the return-to-center function only after the disengagement of the curved touchpad (e.g., such that a user does not feel any back-pressure while touching the curved touchpad).

In some embodiments, the throttle mode may include a damping function. For example, to increase the intuitive feel of the controller, a velocity-dependent (or acceleration-dependent) damping function may be used such that a motor resistance applied to resist rotation of the knob increases (or decreases) based on the velocity with which the knob is rotating. This increase may be a linear increase, an exponential increase, or any other function. Additionally or alternatively, a viscous damping factor (or gain) may be used to further increase (or decrease) the damping function.

In some embodiments, the throttle mode may include a sonic function. For example, a sonic function (e.g., a sound wave) may be produced by the motor by oscillating torque. By altering the number of oscillations per second, the frequency of the sonic function can be affected. The intensity (i.e., the sound per power unit of area) of the sonic function can be affected by increasing or decreasing power to the motor. The throttle mode may be configured such that a sound only occurs when the knob is in a certain zone (e.g., a range of positions from an initial position). Similarly, the sound may only occur for a certain duration of time upon entry to the zone and can only occur again by leaving the zone and re-entering the zone. Additionally or alternatively, a gain may be applied to increase or decrease the sonic function.

In some embodiments, the throttle mode may include a force-dependent function (e.g., derivative of force applied). For example, the controller may apply a force to the knob (via the motor) that varies based on a force being applied to the knob. In some embodiments, the force-dependent function may vary with the derivative of the force being applied to the knob. Additionally or alternatively, a gain may be applied to increase or decrease the force-dependent function.

The throttle mode may also include metadata for any of the functions. For example, the gains or damping factors may be stored as metadata in memory storage. Another example of metadata may include an angle range to which the operational mode applies. For example, the function may only apply to 180 degrees of rotation on the knob or to any other range.

II. ILLUSTRATIVE SYSTEMS

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a robotic arm, a humanoid robot, or a quadruped robot, among others. In other examples, robotic system 100 may define a vehicle, a watch, a washing machine, actuated blinds, a conveyer belt, a speaker, or a light bulb, among many other examples. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 100). In other cases, an actuator may be a linear actuator that may be used in systems involving straight line motion. In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

The above description of processor(s) 102, data storage 104, program instructions 106, sensor(s) 110, and power source(s) 112 may apply to any discussion below relating to the respective component being used in another system or arrangements. For instance, FIGS. 2A and 3A (among other possible figures) illustrate processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure.

Figure 1B:
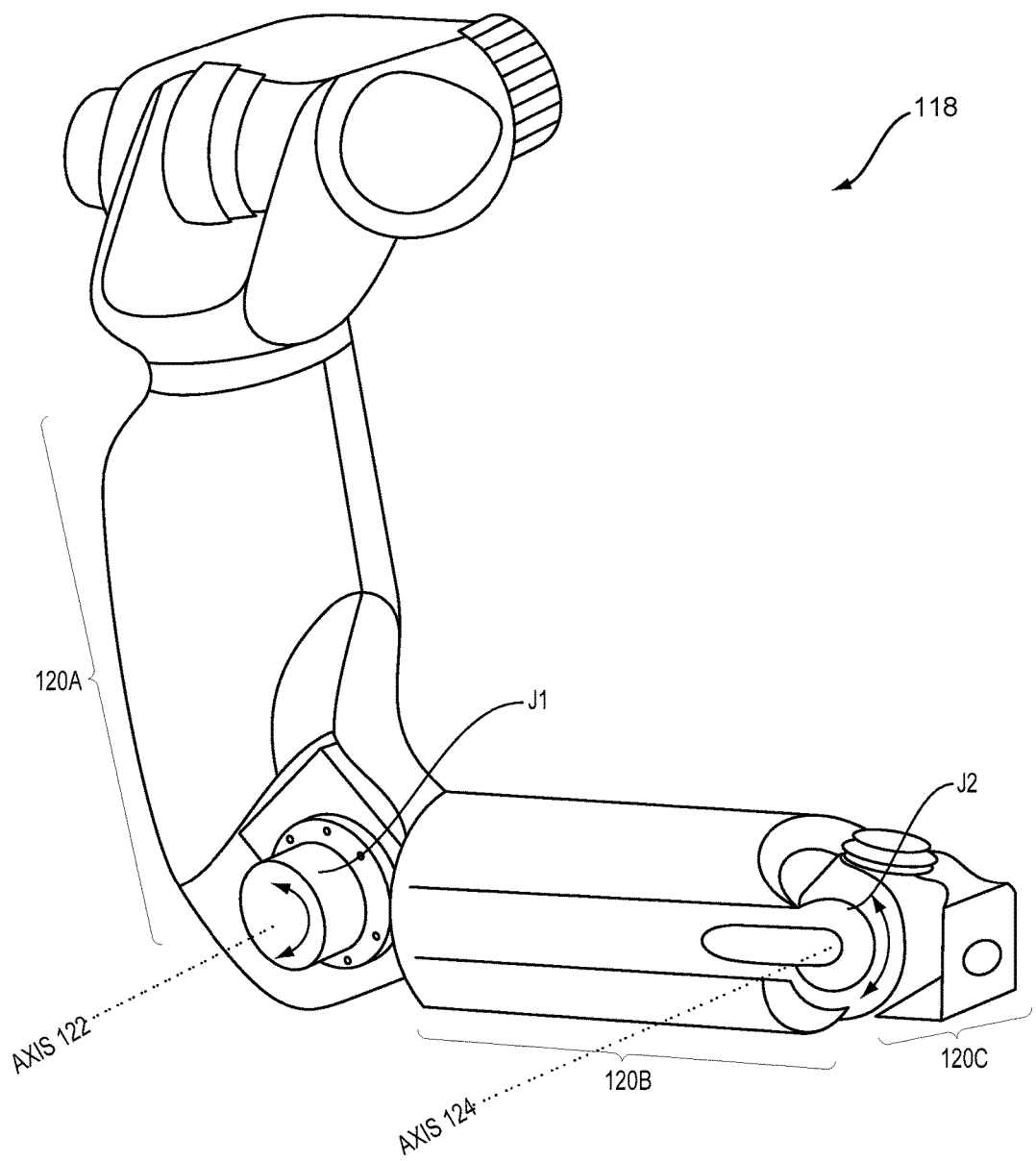

A robotic system 100 may take on various forms. To illustrate, refer to FIG. 1B showing an example robotic arm 118. As shown, the robotic arm 118 includes movable component(s) 116 such as appendages 120A, 120B, and 120C, among others. Additionally, the robotic arm 118 includes joints J1 and J2, each coupled to one or more actuators (not shown) such as actuator(s) 114. The actuators in joints J1 and J2 may operate to cause movement of various movable component(s) 116 such as appendages 120A, 120B, and 120C. For example, the actuator in joint J1 may cause movement of appendage 120B about axis 122 (e.g., resulting in rotation about an axis of joint J1). Whereas, the actuator in joint J2 may cause movement of appendage 120C about axis 124 (e.g., resulting in rotation about an axis of joint J2). Other examples may also be possible.

Figure 2A:
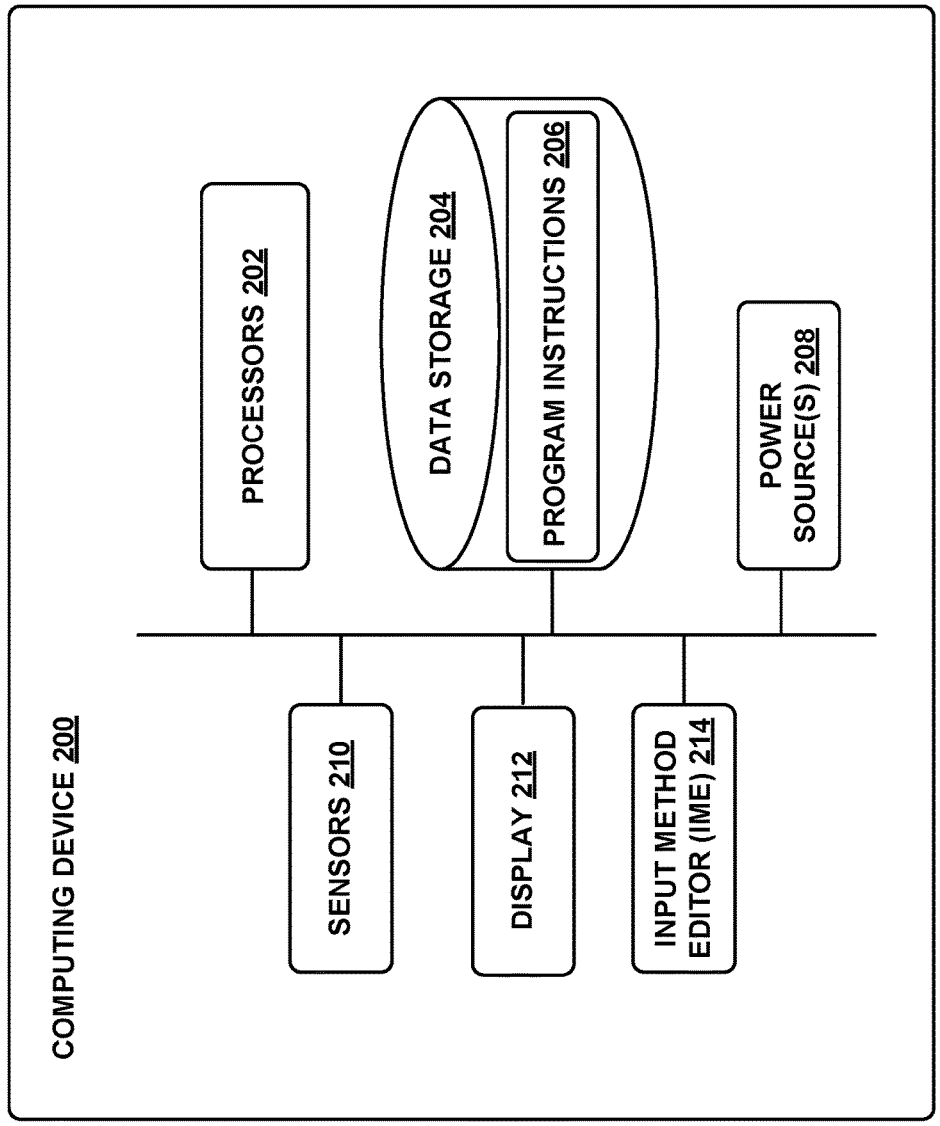
FIGS. 2A and 2B illustrate an example computing device, according to an example implementation.

FIG. 2A is a block diagram showing components of an example computing device 200 that includes one or more processors 202, data storage 204, program instructions 206, power source(s) 208, sensors 210, display 212, and Input Method Editor (IME) 214. Note that the computing device 200 is shown for illustration purposes only and computing device 200 may include additional components and/or have one or more components removed without departing from the scope of the disclosure. Further, note that the various components of computing device 200 may be arranged and connected in any manner.

Display 212 may take on any form (e.g., LED, LCD, OLED, etc.). Further, display 212 may be a touchscreen display (e.g., a touchscreen display on a tablet). Display 212 may show a graphical user interface (GUI) that may provide an application through which the user may interact with the systems disclosed herein.

Further, the computing device 200 may receive user input (e.g., from the user of the computing device 200) via IME 214. In particular, the IME 214 may allow for interaction with the GUI such as for scrolling, providing text, and/or selecting various features of the application, among other possible interactions. The IME 214 may take on various forms. In one example, the IME 214 may be a pointing device such as a computing mouse used for control of the GUI. However, if display 212 is a touch screen display, user touch input can be received (e.g., such as using a finger or a stylus) that allows for control of the GUI. In another example, IME 214 may be a text IME such as a keyboard that provides for selection of numbers, characters and/or symbols to be displayed via the GUI. For instance, in the arrangement where display 212 is a touch screen display, portions of the display 212 may show the IME 214. Thus, touch-input on the portion of the display 212 including the IME 214 may result in user-input such as selection of specific numbers, characters, and/or symbols to be shown on the GUI via display 212. In yet another example, the IME 214 may be a voice IME that may be used that receives audio input, such as from a user via a microphone of the computing device 200, that is then interpretable using one of various speech recognition techniques into one or more characters than may be shown via display 212. Other examples may also be possible.

Figure 2B:
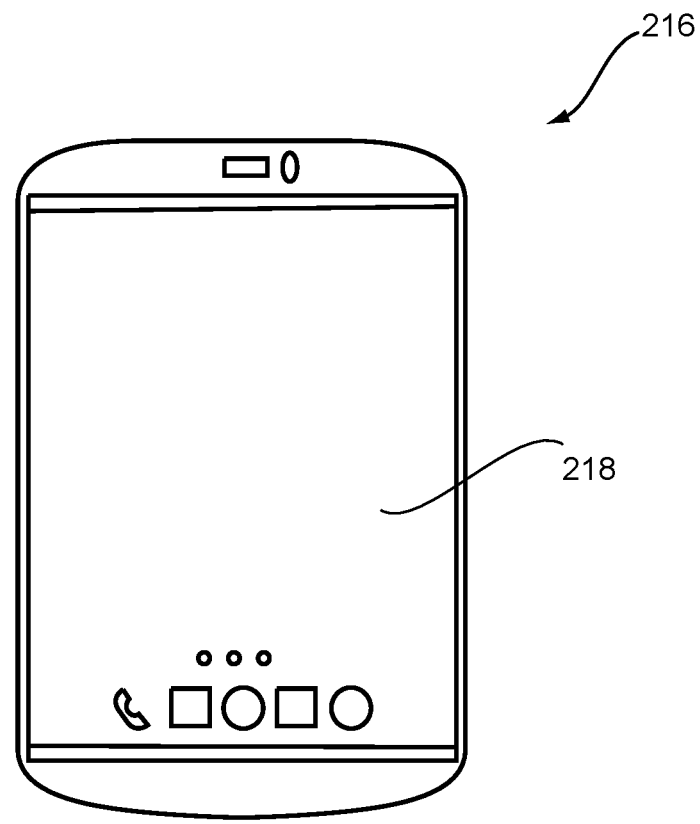

A computing device 200 may take on various forms. For instance, the computing device 200 may take the form of a desktop computer, a laptop, a tablet, a wearable computing device, and/or a mobile phone, among other possibilities. To illustrate, refer to FIG. 2B showing an example tablet 216. As shown, the tablet 216 includes touch-screen display 218 that is configured to display a GUI and receive user-input such as by way of one or more touch gestures provided by a user of the tablet 216. Note that the tablet may also include other components not shown and described herein.

Figure 3A:
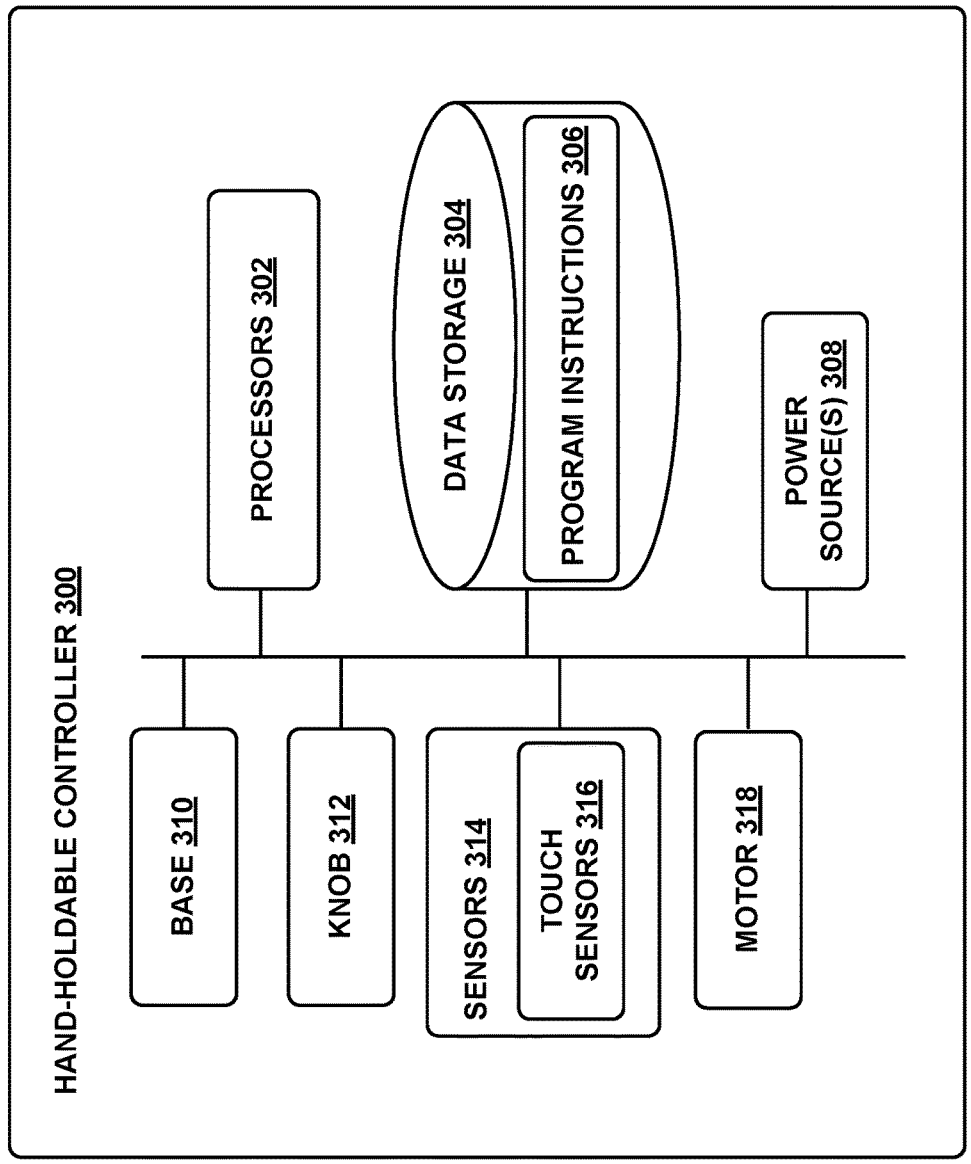
FIGS. 3A, 3B, 3C, and 3D illustrate an example hand-holdable controller, according to an example implementation.
Figure 3B:
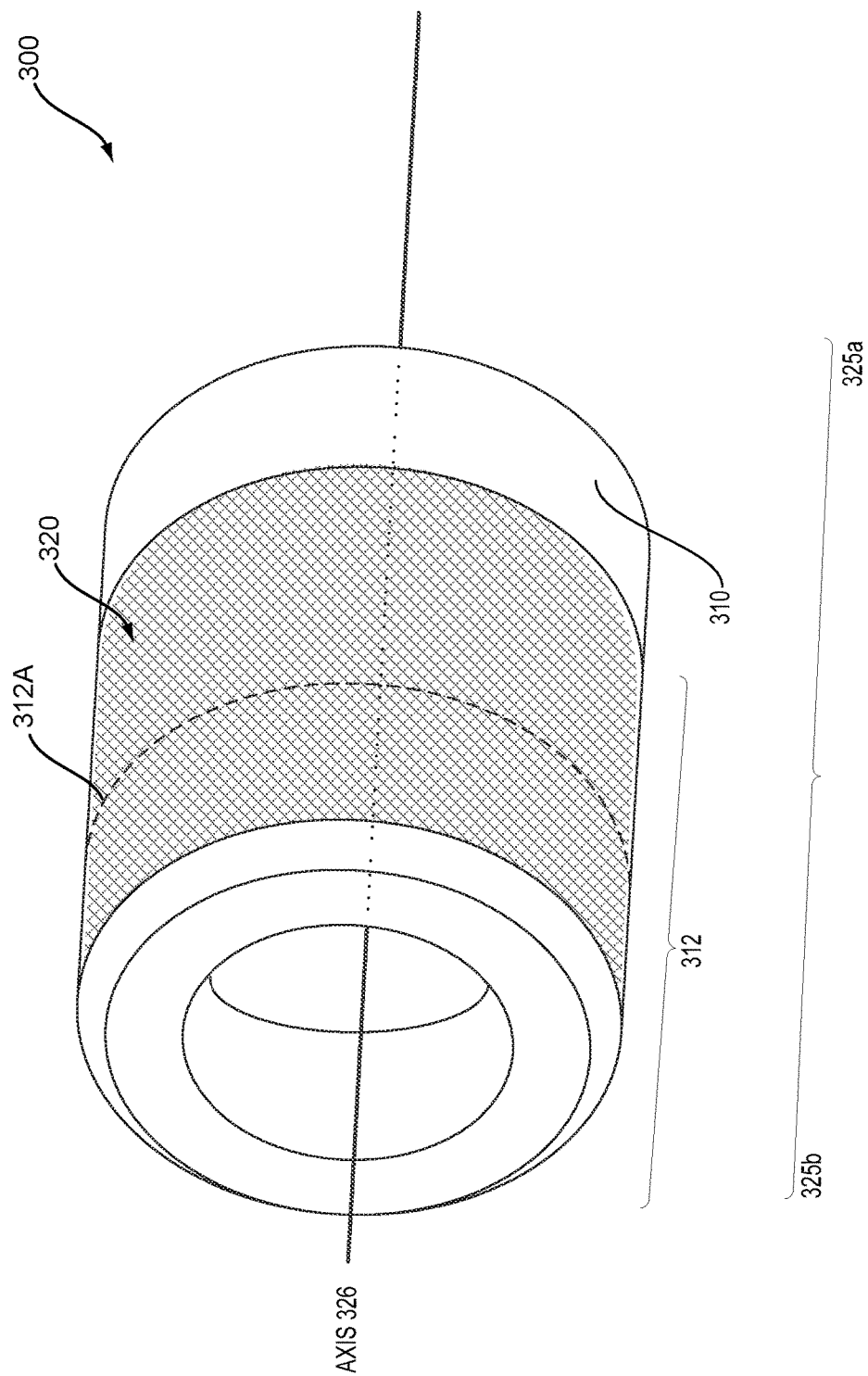

FIG. 3A is a block diagram showing functional components of a haptic hand-holdable controller 300, according to an example implementation. FIG. 3B is an illustration showing one possible implementation of a hand-holdable controller 300, which may include some or all of the components shown in FIG. 3A. A haptic hand-holdable controller 300 may also be referred to herein as a hand-holdable controller, a hand-holdable-controller system, a controller system, a wireless controller, or simply as a controller. In an example implementation, the components shown in FIG. 3A may be part of a hand-holdable controller with a motorized knob, which can also receive input via a curved touchpad on its outer surface. Other implementations, which utilize other components, are also possible.

In FIG. 3A, the hand-holdable controller 300 is shown to include one or more processors 302, data storage 304, program instructions 306, power source(s) 308, a base 310, a knob 312, sensors 314 such as touch sensors 316, and a motor 318. Note that the hand-holdable controller 300 is shown for illustration purposes only and hand-holdable controller 300 may include additional components and/or have one or more components removed without departing from the scope of the disclosure. Further, note that the various components of hand-holdable controller 300 may be arranged and connected in any manner.

Base 310 may be arranged so as to allow a user to grasp onto (e.g., hold) the hand-holdable controller 300 with one hand, while rotating the knob 312 with their other hand. Such a base 310 may be any shape, size, and/or form. Additionally or alternatively, the base 310 may be arranged to be positioned on and/or coupled to a surface or a robot joint (or another entity). With this arrangement, the user would not necessarily have to grasp onto the base 310 (e.g., so as to hold the controller 300) and could thus rotate the knob 312 with the controller 300 essentially positioned on and/or coupled to the entity. In a further aspect, this base 310 may be coupled to one or more other components of the hand-holdable controller 300, and/or may be integrated as part of a controller housing (e.g., that extends into a center cavity in the knob 312 such that the knob 312 can rotate about the portion of the housing that extends from the base 310).

Rotatable knob 312 can take on various forms, such as the cylindrical form shown in FIG. 3B, or a conical form, among other possibilities. References herein to a "cylindrical" knob or other "cylindrical" components of the controller should be understood to encompass cylindrical, conical and other forms of the knob 312 and/or other component. With such example arrangements, the controller 300 may be thus configured so that a user can provide input to the controller 300 by way of rotating the knob 312 about (e.g., relative to) the base 310. For example, the degree and/or speed of rotation of the knob 312 may provide input for control of, e.g., a robotic device.

Further, the hand-holdable controller 300 may include one or more sensors 314 such as any of the example sensors discussed above in the context of the sensor(s) 110 of robotic system 100. For instance, the hand-holdable controller 300 may include touch sensors 316 such as capacitive sensors, for example. The touch sensors 316 may be positioned and/or integrated within the knob 312 and/or within other components of the hand-holdable controller 300. For instance, the touch sensors 316 may be arranged to detect touch on one or more surfaces of the knob 312. To do so, the touch sensors 316 could, for example, take the form of a curved touchpad arranged along at least a portion of the one or more surfaces. With such example arrangements, touch data received via these touch sensors 316, such as during rotation of the knob 312, may be used to control various aspects of the robotic system 100 (e.g., via the computing device 200) and/or various aspects of the computing device 200 as further discussed below.

In an example implementation, such as that shown in FIG. 3B, the hand-holdable controller 300 may rotate about a central axis 326, and the touch sensors may be arranged to provide a curved touchpad 320, which may also be referred to as a cylindrical touch surface. In FIG. 3B, the cylindrical touch surface 320 is indicated by the crosshatch pattern on the surface of the knob 312. Further, in some implementations, the cylindrical touch surface 320 can extend around the entire outer surface of the knob (or portions thereof), such that the touch surface is a full cylinder (e.g., with no gaps in touch sensing anywhere in the circumference of the knob 312).

The hand-holdable controller 300 may additionally or alternatively include other tactile sensors as well. For example, hand-holdable controller 300 may include any sensor that generates information arising from physical interaction with the environment of the hand-holdable controller 300, such as capacitive sensors, positional feedback sensors, pressure sensors, proximity sensors, strain gauges, force sensors, temperature sensors, magnetic sensors, or others. For example, the hand-holdable controller 300 may include a proximity sensor (e.g., a Hall-effect sensor or an infrared sensor) to detect the presence of objects near the hand-holdable controller 300 but that are not in contact with the hand-holdable controller 300.

In some implementations, the hand-holdable controller 300 may not include any mechanical or structural interface features (e.g., mechanical buttons, switches, jacks, connectors, or controls), other than the knob 312. In such an implementation, the rotation of the knob 312 and tactile or touch input may be the only forms of user input that are possible via the controller 300. Alternatively, the hand-holdable controller 300 may include other interface features (not shown in the Figures) in addition to the knob 312. For example, the hand-holdable controller 300 may include a power switch or button, or other buttons, switches, jacks, connectors, or controls for providing input via the hand-holdable controller 300.

In an example implementation, the hand-holdable controller 300 may include at least one motor 318 that is operable to apply torque-generating force to knob 312. The motor 318 may be a brushed DC motor, a brushless DC motor, or an AC motor such as a synchronous electric motor or an induction motor, among other possibilities. Additionally, the motor 318 may include a motor shaft, a stationary stator, and a rotor coupled to the motor shaft such that the motor shaft is configured to deliver mechanical power to, for instance, a transmission assembly, thereby causing a rotation of the transmission assembly (which may be coupled to knob 312).

More specifically, the shaft of motor 318 may operably connected to the knob 312 and/or to a control component, such that the control component can receive an electrical input signal to control the rotation of the shaft (and thus the knob 312 as well). Alternatively, the knob 312 may be connected directly to the control component (e.g., not by way of a shaft), among other possible arrangements. For example, a slip ring or rotary transformer may be used to couple electrical signals between two parts that rotate in relation to each other, and thereby to power the rotatable portion of the hand-holdable controller 300 (e.g., to rotate the knob 312).

In a further aspect, the hand-holdable controller 300 may also include (i) potentiometers and/or variable capacitors that could be used for applications such as determining a rotary position of the knob 312 as the knob 312 rotates due to torque from the motor 318 and/or due to an external torque and/or (ii) a rotary switch that could be used to change configuration (e.g., power on or off) of the controller 300 in accordance with rotation of the knob 312 due to torque from the motor 318 and/or due to an external torque, among other components.

With the above example arrangement, the at least one motor 318 is controllable in order to vary the amount, and possibly the direction, of the torque that is applied to the knob 312. In particular, motor 318 may be operable to affect and/or resist rotation of the knob 312. For instance, the motor 318 may provide haptic feedback and/or change the "feel" of the knob 312 by applying torque to the knob in a clockwise or counter-clockwise direction. By way of example, the motor may be operable to, e.g., make rotation of the knob 312 by the user more or less difficult, to back drive a hand of a user holding the knob by way of rotational feedback, to rotate the knob 312 without additional torque being applied by a user, to replicate the feel of detents or clicks during the rotation of the knob, and/or to provide vibrational feedback, among other possibilities.

In a specific example, the controller 300 may control a joint of robotic system 100 (e.g., via computing device 200 as discussed below). In this example, the motor 318 could resist (or back drive) rotation of the knob 312 in response to a determination (e.g., by the computing device 200) that a moveable component coupled to the joint is entering a non-permissible zone (e.g., unsafe zone), such as within a threshold distance of a human for instance. Other examples are also possible.

As noted above, FIG. 3B shows an example implementation of a hand-holdable controller 300. As shown, the example hand-holdable controller 300 includes a base 310, a knob 312, and a motor (not shown) as well as any of the components discussed above in the context of hand-holdable controller 300. The controller 300 may have a proximate end 325a that is near the base 310 (illustrated in FIG. 3B near the bottom of the base 310) and a distal end 325b (illustrated in FIG. 3B near the top of the knob 312). The knob 312 may rotate or be rotated clockwise and/or counterclockwise about axis 326 in order to control a robotic system or a component thereof in various ways.

Further, touch data (or tactile data) may be received, during the rotation of the knob 312 or while the knob 312 is stationary, from one or more sensors (e.g., touch sensors 316 or tactile sensors) positioned on one or more surfaces of the knob 312. This touch data may affect the manner the robotic system 100 is being controlled. To illustrate, refer to example FIGS. 3C-3D showing different hand positions on the example hand-holdable controller 300.

Figure 3C:
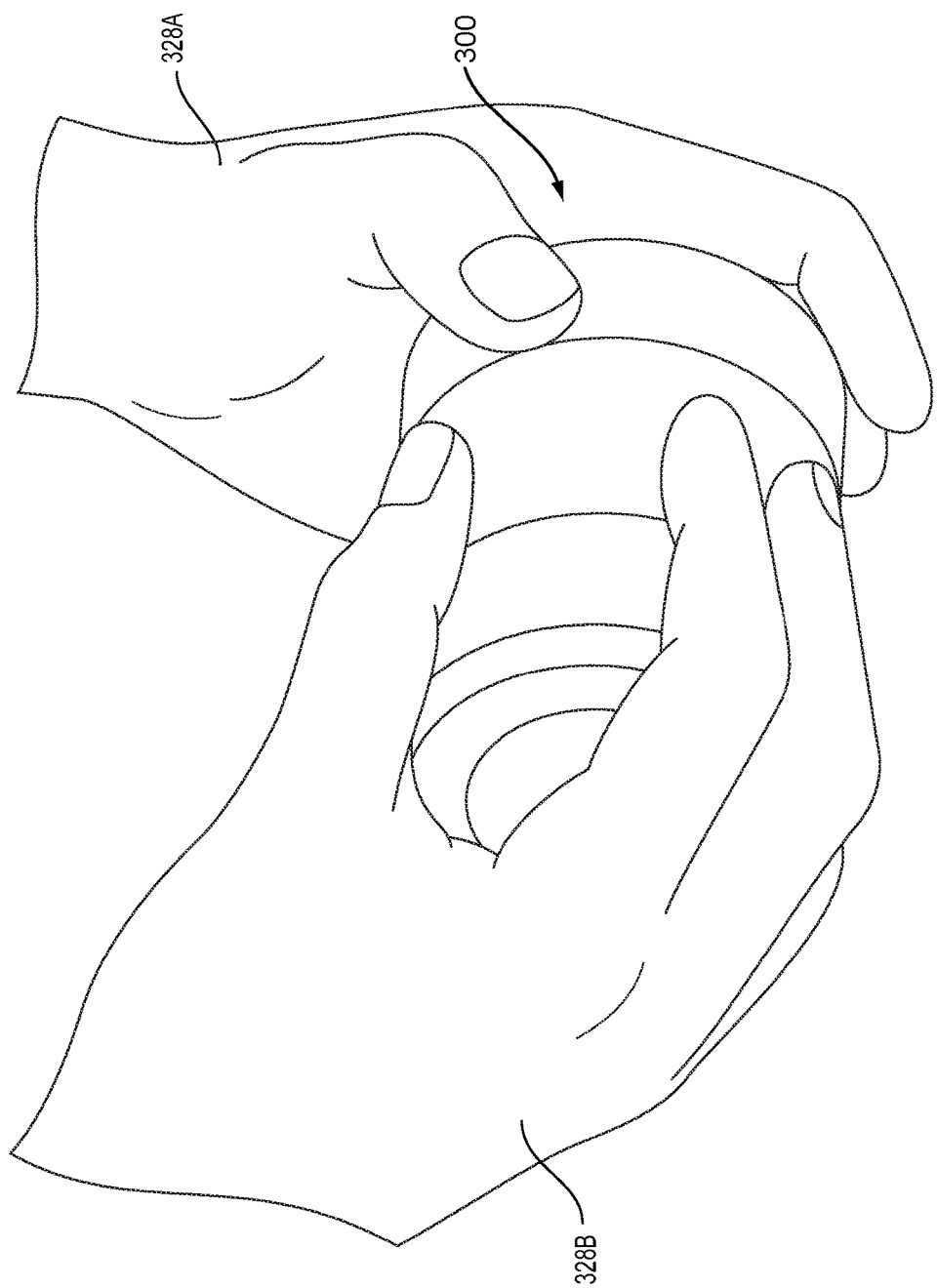

FIG. 3C shows a hand 328A of a user grasping onto the base 310 of the hand-holdable controller 300 such as for the purpose of holding onto the hand-holdable controller 300. Whereas, the other hand 328B of the user grasps onto the knob 312 such as for the purpose of providing user-input by rotation and/or touch of the knob 312. As shown, the hand 328B grasps onto a relatively large surface area of the knob 312 such as by several fingers as well as the palm on the surface area of the knob 312. The touch sensors may detect this particular touch gesture (e.g., this touch gesture may be referred to as a "full grip" or "full grasp") by the user and may provide corresponding touch data representing this particular touch gesture.

Figure 3D:
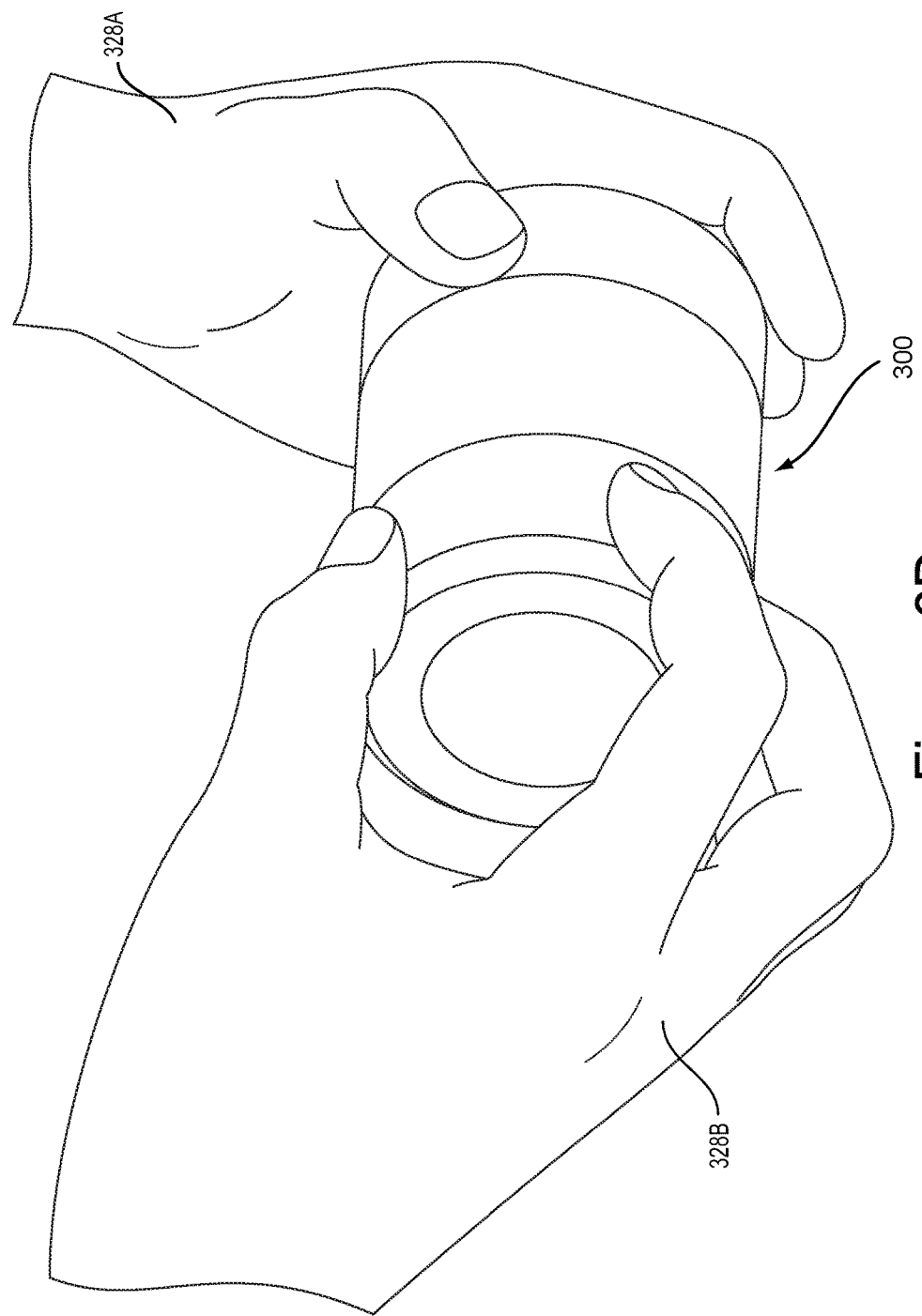

In contrast, FIG. 3D shows the hand 328A of the user grasping onto the base 310 in the same manner as in FIG. 3C. However, in this case, the other hand 328B of the user grasps onto a relatively small surface area of the knob 312 such as by placing only fingertips on the surface area of the knob 312 close to the distal end 325b. The touch sensors may detect this different particular touch gesture (e.g., this touch gesture may be referred to as a "fingertip grip" or "fingertip grasp") by the user and may provide different corresponding touch data representing this different particular touch gesture. As such, the touch illustrated in FIG. 3D may result in different control functionality of the robotic system 100 (and/or the computing device 200) than the touch illustrated in FIG. 3C. Moreover, different touch gestures may result in different control functionality even if the characteristics of the rotation of the knob 312 (e.g., amount and/or speed of rotation) are the same across different touch gestures and/or even if the component being controlled is the same across different touch gestures.

Many other example touch gestures (e.g., actions which may generate touch data, such as gestures, grips, grasps, touches, and/or other tactile information) may also be possible without departing from the scope of the disclosure. For example, the hand 328A of the user may grasp onto base 310 in the same manner as in FIGS. 3C and 3D. However, other touch gestures may include one or more of (i) a palming, (ii) a partial grip (with finger extension or retraction), (iii) a multi-finger sequence, (iv) a multi-touch, (v) a drag, (vi) a side surface hold, (vii) a side surface swipe, (viii) a fingertip only, (ix) a single tap (possibly at a certain location or within a certain area on the surface of the knob), (x) a double tap (possibly at a certain location or within a certain area on the surface of the knob), and/or (xi) a swipe or swipe pattern (possibly at a certain location or within a certain area on the surface of the knob), among other possibilities.

As one specific example, a palming grip may entail the palm of hand 328B to be placed on the top of the knob 312 (e.g., at the top of the proximate end 325a of hand-holdable controller 300). For example, an intuitive use of the palming grip may be as an indication of a stop command. Thus, the hand-holdable controller 300 may interpret touch data indicative of a palming and issue a stop command to the computing device 200 or robotic system 100 (or the hand-holdable controller 300 may send the palming touch data to the computing device 200, which in turn sends a command to stop the robotic system 100 from performing an action or to stop an action that the robotic system 100 is currently performing).

In another example of touch input, a partial grip may be interpreted from touch data that indicates a touch gesture somewhere between the grips illustrated in FIGS. 3C and 3D. For example, similar to the full grip show in FIG. 3C, all five fingers of hand 328B of the user may be used to grasp the hand-holdable controller 300 but, for the partial grip, those fingers may be placed closer to the distal end 325b (e.g., above the dividing line 312A of the knob 312 illustrated in FIG. 3B). In the partial grip (although applicable to other grips as well), touch input related to a finger retraction or finger extension may be used to generate touch data. For example, sensors (such as touch sensors 316) may detect a finger retraction (e.g., one or more fingers of hand 328B sliding or moving towards the distal end 325b of hand-holdable controller 300) or a finger extension (e.g., one or more fingers of hand 328B sliding or moving towards the proximate end 325a of hand-holdable controller 300). This finger retraction or extension may vary the commands sent to the robotic system 100. For example, a partial grip plus a finger extension may send control signals of increased magnitude as the fingers extend further. Likewise, a partial grip plus a finger retraction may send control signals of decreased magnitude as the fingers retract further. Other example touch gestures are possible and may be programmable (e.g., via IME 214 or other hardware or software).

Alternatively, a partial grip may be defined in other ways. For example, a partial grip may be defined as a full grip minus one or more pieces of touch input (e.g., touch input indicative of five (or less) fingers with no touch input indicative of a palm on top of knob 324).

In another example of touch input, a finger sequence may be used. For example, touch input indicative of the fingers of hand 328A being placed in a certain sequence may be used to generate touch data. For example, placing the five fingers down in a pattern may be identified and used. For example, a touch input indicative of the user touching the knob 324 first with the thumb and then subsequently with each finger of hand 328a may be used to power the device on or off, or accomplish any other functions. Likewise, any other finger sequence could be identified and used. For example, touch input indicative of a single finger tap (or thumb tap or palm tap) on any touch-sensitive surface could be used. Likewise, touch input related to a swipe could be used. For example, an index finger of hand 328B may be placed on top of knob 324 and swiped in a pattern (e.g., a clockwise pattern) to generate touch data.

Touch gestures can be used in combination to vary the control signals sent to the robotic system 100. For example, a full grip being performed simultaneously with a rotation of the knob 312 may actuate a joint at a high speed. By adding in a touch gesture (e.g., a fingertap) to the full grip and rotation, the control signal may be varied. For example, the speed or magnitude of the control signal may be varied. Similarly, a different component may be controlled by the additional touch gesture (e.g., the fingertap may generate a control signal to close a gripper).

Other examples of touch input that may be used to generate touch data include, for example, a multi-touch (e.g., a combination of touches, such as a full grip followed by a palming, a drag (e.g., an identified grip followed by a dragging motion), a side surface hold (e.g., two fingers of hand 328B placed and held alongside knob 312), and a side surface swipe (e.g., two fingers of hand 328B placed alongside knob 312 and swiped in a clockwise manner). Of course, many other examples of touch input are possible. Also, note that feedback (e.g., vibrational feedback, clicks, detents) could be provided by the controller 300 in response to transitions between such touch inputs.

Figure 4:
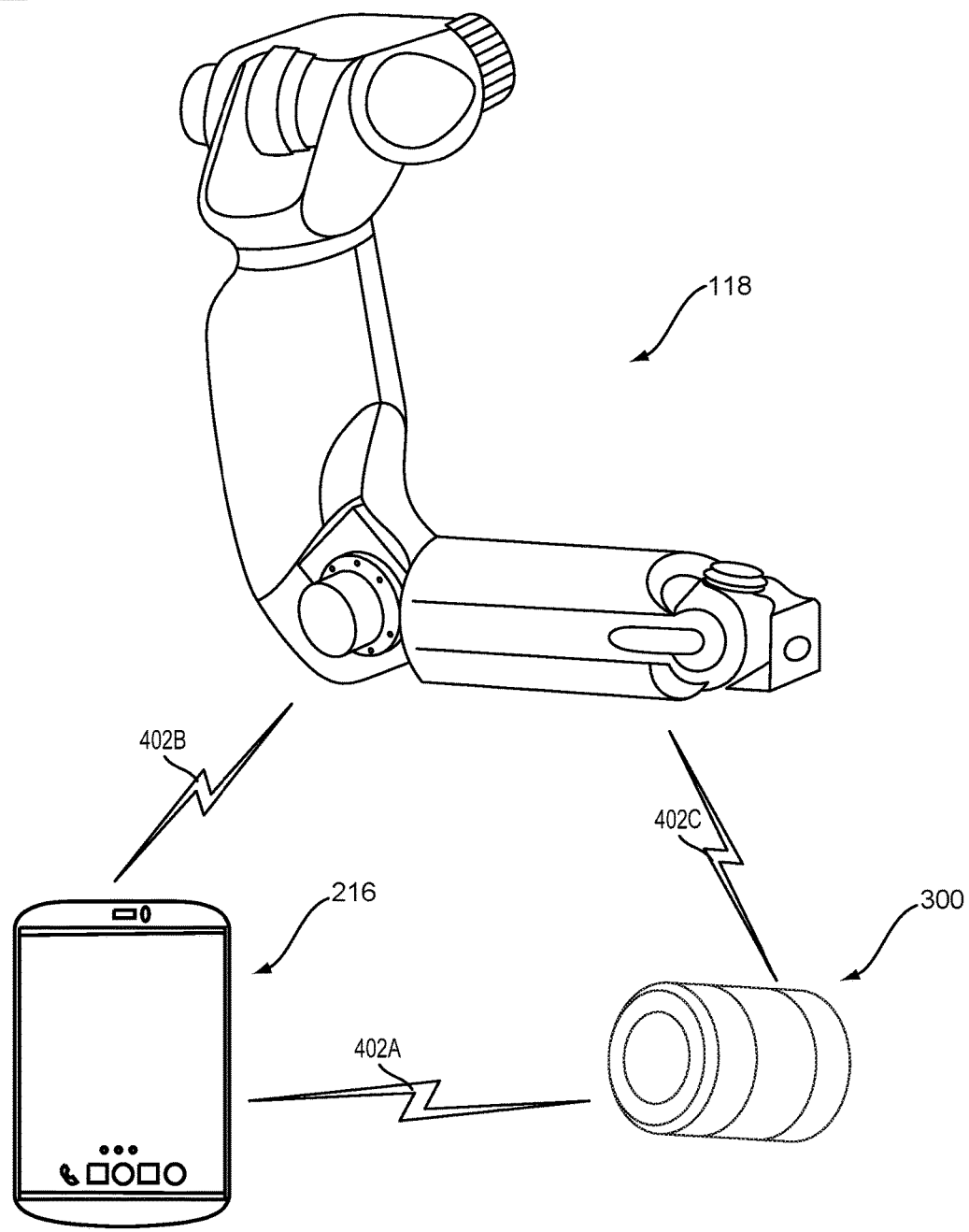
FIG. 4 illustrates example communication links, according to an example implementation.

Robotic system 100, computing device 200, and/or hand-holdable controller 300 may communicate with each other in various ways. To illustrate, refer to FIG. 4 showing an example arrangement 400 including communication links 402A, 402B, and 402C that provide for exchange of information between the various systems. For instance, communication link 402A provides for communication between example hand-holdable controller 320 and tablet 216, communication link 402B provides for communication between tablet 216 and robotic arm 118, and communication link 402C provides for communication between robotic arm 118 and example hand-holdable controller 320. Note that other arrangements may also be possible as some communication links may be removed and other communication links may be added such as for communication with other devices not discussed herein.

Communication links 402A, 402B, and 402C may include wired links and/or wireless links (e.g., using various wireless transmitters and receivers). A wired link may include, for example, a parallel bus or a serial bus such as a Universal Serial Bus (USB). A wireless link may include, for example, Bluetooth, NFC, IEEE 802.11 (IEEE 802.11 may refer to IEEE 802.11—2007, IEEE 802.11n—2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

In an example implementation, the hand-holdable controller 300 may be configured to receive instructions (e.g., from computing device 200) indicating an operational mode for the hand-holdable controller 300 (e.g., for the rotatable knob 312), so as to essentially load the operational mode onto the controller 300. In some embodiments, the operational mode may be pre-programmed, may change or be set based on touch input, or may change or be set based on other criteria (e.g., based on sensor information such as inertial attitude data from an inertial measurement unit, gyroscope, and/or accelerometer). Such an operational mode may define operational parameters of the motor (e.g., motor 318) of the hand-holdable controller 300. As such, different operational modes may provide different "feels" to the knob by varying the haptic characteristics of the knob 312. In particular, different "feels" can be provided by varying the torque applied to the knob as it rotates and/or otherwise varying when and how torque is applied to the knob 312 and/or by varying the type (or type of control) of motor 318 (e.g., by using a position rotation motor, a continuous rotation motor, a linear motor, etc.).

For example, a given operational mode may specify a specific amount of turning resistance, or in other words, a specific amount of torque that counters rotation by the user (making it harder or easier for the user to turn the knob). In another example, an operational mode may specify a rotationally-varying torque profile, which varies the amount of resistance to turning as the knob rotates. In some embodiments, a positional rotation servomotor may be used where the torque rating of the servomotor at a particular position must be overcome to turn the knob. Other examples are also possible.

In another aspect, a given operational mode may specify a range of rotation to which the knob 312 is restricted. To do so, an operational mode may define the number of degrees of rotation from a base orientation that are permissible in one or two directions. For example, an operational mode may limit rotation to within plus or minus 45 degrees from a center point. Other examples are also possible.

In yet another aspect, a given operational mode may set limits on the speed at which the knob can turn. For instance, a given operational mode may set a maximum or minimum number of degrees per second. Further, in some implementations, an operational mode may vary the maximum or minimum speed of rotation as a function of the number of degrees the knob has rotated from a base orientation.

In yet another aspect, a given operational mode may indicate whether or not to apply a return-to-center function, which returns the knob to a base orientation when certain conditions are met. For example, a return-to-center function may rotate the knob back to a base orientation whenever input data from the touch sensors on the knob indicates that the user has released the knob. As another example, a return-to-center function may only respond to release of the knob by rotating the knob back to the base orientation in certain orientations of the knob (e.g., when the knob has been rotated by at least some threshold amount from the base orientation, or when the knob has reached a rotation limit).

In yet another aspect, a given operational mode may specify certain orientations or a certain range of rotation during which free spin of the knob should be allowed. In particular, when the knob is put in a free-spin mode, the motor may be disabled such that the knob is allowed to rotate freely about the stator of the motor. An operational mode may also specify certain trigger events that trigger the enabling or disabling of free-spin mode. For example, an operational mode could define a certain touch gesture or gestures that enable and/or disable the free-spin mode. Other examples are also possible.

Other haptic parameters may also be adjusted or set by a given operational mode. For example, the hand-holdable controller may be configured to provide a variable resistance through customizable arc sizes of various sizes. As a specific example, a full (or partial) rotation of the knob could be divided into a variable number of arcs, and each arc could be of various sizes. Each of the variable number of arcs could be defined to have a specific feel (e.g., one or more operational modes, such as resistance levels, speed, detents or no detents, etc.). Other examples are also possible.

In a further aspect, an operational mode may also specify how touch input that is received via a knob controller should be interpreted and/or translated into control signals for a robot system. For example, an operational mode may define one or more touch gestures that are available for use in the operational mode, and how these touch gestures should be interpreted. Various types of touch gestures may be defined and mapped to control functions, depending upon the particular implementation.

In some cases, an operational mode may define one or more touch gestures that can be used to switch from the operational mode to one or more other operational modes. Additionally or alternatively, touch gestures that place a knob controller into a given operational mode may be defined globally, such that the controller can be placed into the given operational mode from any other operational mode. In either case, touch gestures may be used to vary the feel of the knob as it is rotated, and/or to vary manner in which rotation of the knob 312 is interpreted into robot control signals. For instance, control signals sent via rotation of the knob may vary based on different manners in which a user gestures or grasps the knob 312 and/or may vary based on the location of the touch gesture along the one or more surfaces of the knob 312, among other possibilities.

According to an example implementation, the hand-holdable controller 300 may detect a rotation of the control knob (e.g., knob 312), and may indicate that rotation of the knob to the computing device 200. Additionally or alternatively, the hand-holdable controller 300 may provide output data to a controller application running on computing device 200, which is indicative of detected touch data (e.g., during rotation of the knob). As such, the computing device 200 may determine the rotation of the knob 312 and/or touch gestures performed on the knob 312, and may responsively generate corresponding control signals for another device (e.g., robotic system 100) in accordance with the rotation and/or detected touch.

To control a device, such as robotic system 100, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As discussed, these particular operations are based on an interpretation of the input data received by the computing device 200 from the hand-holdable controller 300.

Although reference is made throughout to a hand-holdable controller, this disclosure is not limited to hand-holdable controllers. For example, the controller 300 could attach to a vertical surface (e.g., via a mechanical and/or magnetic attachment system). In another example, the controller 300 could attach directly to a device (or portion of a device) it is controlling, such as a speaker, a robot arm, a motorcycle, a bicycle, a lighting system, or another controllable device. The controller 300 could be configured to attach to an electric vehicle (e.g., an all-terrain vehicle, bicycle, motorcycle, etc.) as the sole means of throttle control, thus providing anti-theft protection to the electric vehicle (i.e., without a way to control throttle there is no way to control propulsion).

Figure 5:
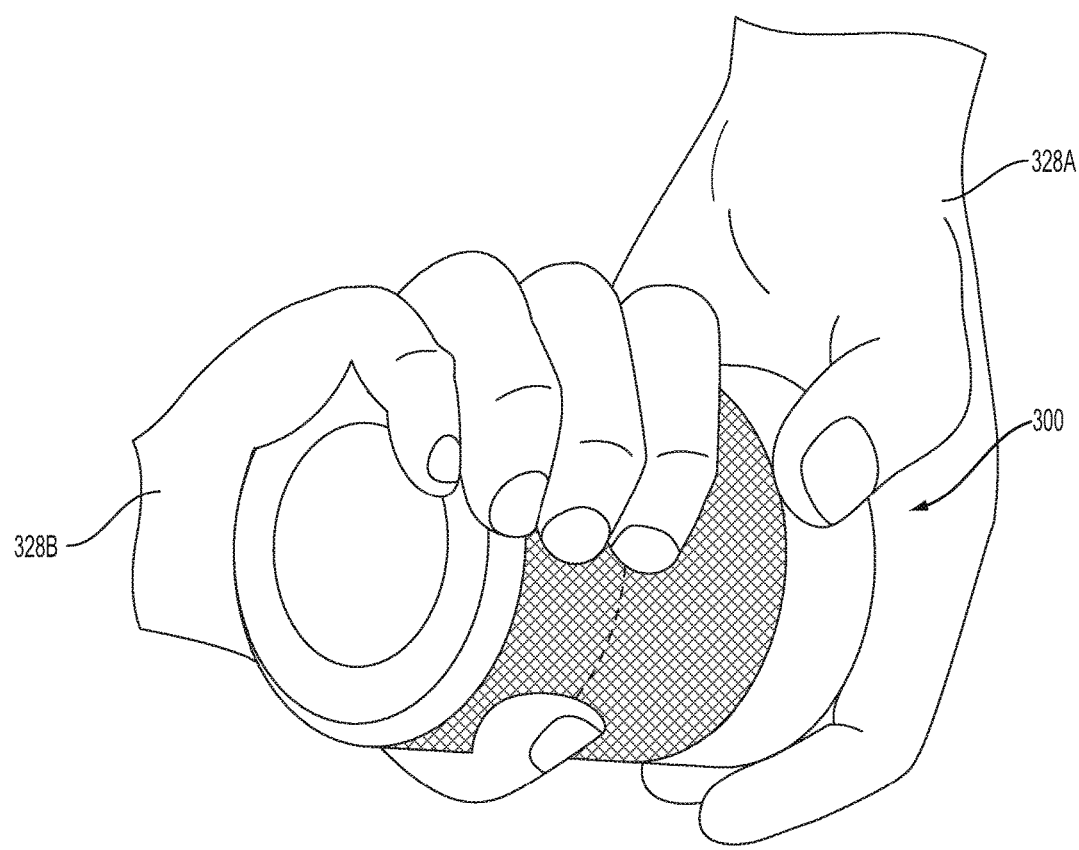
FIG. 5 illustrates an example hand-holdable controller, according to example implementations.

FIG. 5 shows a hand 328A of a user grasping onto the base 310 of the hand-holdable controller 300 such as for the purpose of holding onto the hand-holdable controller 300. Whereas, the other hand 328B of the user grasps onto the knob 312 such as for the purpose of providing user-input by rotation and/or touch of the knob 312. As shown, the hand 328B grasps onto a relatively large surface area of the knob 312 such as by one or more fingers wrapping around part of the top surface area of the knob 312, as well as the thumb wrapping around part of the bottom surface area of the knob 312. This grip may be generally referred to as a throttle grip. Other throttle grips may be possible. For example, the hand 328A could be reversed such that the one or more fingers wrap around part of the bottom surface area of the knob 312 and the thumb wraps around part of the top surface area of the knob 312. The curved touchpad (or touch sensors) may detect a throttle grip by the user and may provide corresponding touch data representing this particular touch gesture. Additionally, the controller 300 (e.g., via the IME 214 or program instructions) may provide customizable or pre-programmed throttle grips.

As described previously, the hand-holdable controller may include sensors 314, such as gyroscopes, accelerometers, magnetometers, and others. In some embodiments, an specific operational mode, referred to throughout as "throttle mode" may be applied for throttle functionality. In some embodiments, the throttle mode may be set, based at least in part, on detection of a throttle grip. For example, the control system may detect a throttle grip and responsively load an operational mode to the controller 300, such as a throttle mode, that simulates the feel of a throttle and/or generates robot control signals corresponding to the function of the controller as a throttle.

Additionally or alternatively, the throttle mode may be set based on orientation of the controller 300. The orientation of the controller may be determined from data received from sensor(s) 314, such as from an inertial measurement unit composed of one or more gyroscopes, accelerometers, and/or magnetometers. For example, these sensor(s) 314 may detect the controller 300 being oriented horizontally with respect to the ground and, responsively, may load an operational mode to the controller 300, such as a throttle mode, that simulates the feel of a throttle and/or generates robot control signals corresponding to the function of the controller as a throttle.

The throttle mode may also be set based on a combination of the control system (i) detecting a throttle grip on the controller 300 and (ii) detecting an orientation of the controller 300. For example, the throttle mode may only be loaded to the controller 300 after both (i) detecting a throttle grip on the controller 300 and (ii) detecting that the controller 300 is oriented horizontally with respect to the ground.

The throttle mode may be configured to simulate the functionality of a throttle such as a motorcycle throttle (or to provide a more intuitive throttle controller). For example, various vehicles (e.g., motorcycles, all-terrain vehicles, snowmobiles, jet skis, etc.) include input controls such as throttles in the form of rotary twist-grip mechanisms. These rotary twist-grip mechanisms may be mechanically coupled to linkages (or electronically coupled) that control a throttle plate or throttle valve at an engine. The rotary twist-grip mechanisms may have a maximum travel in one or both directions of rotation via either a physical stop mechanism or a spring mechanism. Rotating the twist-grip in one direction opens the throttle plate or throttle valve, increasing the fuel provided to the engine. Upon release, the twist-grip returns to its initial position, e.g., via the spring bias.

In some embodiments, the hand-holdable controller 300 may include a control system configured to detect a throttle mode input. As used throughout this disclosure, a throttle mode input refers to what is detected (e.g., touch data or sensor data) to put the controller in a specific operational mode (i.e., throttle mode). An operational mode may define both (i) how the controller 300 behaves (e.g., whether it has a sonic function, detents, return-to-center, and/or other functionality) and (ii) how user input (e.g., rotation of knob and touch gestures) should be interpreted and translated into control signals, e.g., robot control signals.

After detecting a throttle mode input, the control system may load the specific operational mode (e.g., the throttle mode functionality and how user input should be interpreted) to the controller 300, the computing device 200, and/or other aspects of the robotic system 100. As described previously, the functionality may be customizable and may include any functions previously described, such as a return-to-center function, a sonic function, a rotationally-varying function. The functionality may apply to the entire 360 degrees or rotation of the knob 312 or may be limited to customizable arcs or ranges of rotation of the knob 312.

After the controller 300 detects a throttle mode input and the throttle mode is loaded to the controller, input data received via the controller (e.g., knob rotation or touch gestures) may then be interpreted to generate system control signals in the manner specified by the operational mode that is loaded. For example, input data received via the controller 300 in throttle mode may be used to generate a control signal to open a throttle (or operate a component of robotic system 100) by a certain amount when the knob 312 is rotated in one direction, start or stop the cruise control function, or otherwise generate control signals for the robotic system 100.

In some implementations, the throttle mode input may include touch data (e.g., touch data corresponding to a throttle grip) received from the curved touchpad 312 of the hand-holdable controller 300. In other implementations, the throttle mode input may include sensor data (e.g., inertial data from an inertial measurement unit comprising one or more gyroscopes, accelerometers, and/or magnetometers). Alternatively, the throttle mode input may be a combination of touch data and sensor data, such as a throttle grip and inertial data corresponding to the hand-holdable controller being oriented in a substantially horizontal position.

Upon detecting the throttle mode input, the hand-holdable controller 300 may be configured to operate in a specific operational mode, e.g., a throttle mode. The throttle mode, as well as functionality related to the throttle mode, may be preconfigured (e.g., via computing device 200 and IME 214), may be configurable (e.g., via touch input or program instructions 306 at the hand-holdable controller or via computing device 200), and/or may include various functionality as previously described in reference to operational modes.

For example, the throttle mode may be an operational mode that specifies one or more positions, such as an initial position, one or more stop positions, and one or more interim positions. The initial position may consist of the position of the knob 312 of the hand-holdable controller in relation to the base 310 of the hand-holdable controller 300 at the time when the throttle mode input is detected. The positions may also be preconfigured or configurable (e.g., the controller may detect a touch input or touch gesture and change the position of the initial position, stop position, and/or interim positions). The stop positions may be programmed to be a certain distance (or number of degrees) in one or more directions. For example, a stop position may be used to simulate the maximum travel of a throttle (i.e., to simulate the end travel of a spring). Interim positions may be used to increase the realism of the throttle mode, e.g., by simulating gear shifts or increasing the granularity of damping, gains, or other functions.

In some embodiments, loading the throttle mode to the controller 300 may cause the controller to implement "return-to-center" functionality. More specifically, the throttle mode may cause the hand-holdable controller 300 to rotate the knob 312 back to its initial position relative to the base 310, when it is released by a user at position other than the initial position. For example, the throttle mode may specify an initial (or base) position of the knob 312 relative to the base 310, or the initial position may be set upon detecting the throttle mode input. In some implementations, the initial position (and other positions) may be determined or set using position sensors, such as rotary encoders or Hall effect sensors. The control system may be further configured to detect a movement of the knob 312 relative to the base 310 (e.g., via a position sensor such as a rotary encoder or Hall effect sensor). The control system may be configured to apply torque-generating force to the motor 318 to return the knob 312 to the initial position.

The control system may apply torque-generating force in various manners. For example, the control system may apply a return-to-center function, e.g., with a constant torque-generating force, immediately upon detecting movement and in the opposite direction of movement (e.g., such that a user feels a constant back-pressure against rotation of the knob 312 during rotation) until the knob 312 returns to the center (or initial) position. Similarly, the control system may apply the return-to-center function only after the disengagement of the curved touchpad (e.g., such that a user does not feel any back-pressure while touching the curved touchpad).

In some implementations, the throttle mode may include a return-to-center function. For example, the control system may apply a return-to-center function for the knob 312, e.g., by applying a constant torque-generating force via the motor 318. This force may be applied immediately upon detecting a movement of the knob 312 from the initial position in a first direction, and in the opposite direction of movement of the first direction (e.g., such that a user feels a constant back-pressure against rotation of the knob during rotation) until the knob returns to the center (or initial) position. Alternatively, the control system may apply the return-to-center function only after the disengagement of the touch sensors (e.g., such that a user does not feel any back-pressure while touching the curved touchpad but the knob 312 returns to center after release).

In some embodiments, the throttle mode may include a damping function. For example, to increase the intuitive feel of the controller 300, a velocity-dependent (or acceleration-dependent) damping function may be used such that the motor 318 applies resistance to rotation of the knob 312. The motor resistance may increase (or decrease) based on the velocity (or acceleration) with which the knob 312 is rotating. This damping function may be linear, exponential, or any other function. Additionally or alternatively, a viscous damping factor (or gain) may be used to further increase (or decrease) the damping function.

In some embodiments, the throttle mode may include a sonic function. For example, a sonic function (e.g., a sound wave) may be produced by the motor 318 by oscillating torque. By altering the number of oscillations per second, the frequency of the sonic function can be affected. The intensity (i.e., the sound per power unit of area) of the sonic function can be affected by increasing or decreasing power to the motor 318. The throttle mode may be configured such that a sound only occurs when the knob 312 is in a certain zone or position (e.g., a range of positions from an initial position). Similarly, the sound may only occur for a duration of time upon entry to the zone and can only occur again by leaving the zone and re-entering the zone. Additionally or alternatively, a gain may be applied to increase or decrease the sonic function.

In some embodiments, the throttle mode may include a force-dependent function (e.g., derivative of force applied). For example, the controller 300 may apply a force to the knob 312 (via the motor 318) that varies based on a force being applied to the knob 312. In some embodiments, the force-dependent function may vary with the derivative of the force being applied to the knob 312. Additionally or alternatively, a gain may be applied to increase or decrease the force-dependent function.

The throttle mode may also include metadata for any of the functions. For example, the gains or damping factors may be stored as metadata in data storage, such as data storage 304. Another example of metadata may include an angle range to which the operational mode applies. For example, the function may only apply to 180 degrees of rotation on the knob 312 or to any other range of rotation.

In another aspect, the control system may oscillate torque through the motor at a specific frequency. This oscillation may produce a sonic output, or sound, such as a "tick" for one second at a certain frequency. In some embodiments, this "tick" may give the effect of bumping into metal. In some embodiments, the sonic output (and other functions as well) may be configured such that it is used once for a small duration of time when entering a window of positions (e.g., within a few degrees of the initial position or a stop position). In some embodiments, for the sonic output to be used again, the knob 312 must leave the window of positions and re-enter the window of positions.

Gains, or damping factors, may also be used with one or more of the control system functions. For example, the velocity-dependent torque may be multiplied by a viscous damping factor to further increase the realism or intuitiveness of the throttle control (e.g., the viscous damping factor may be used with the velocity-dependent torque to make the controller feel like it is moving through mud or more difficult to move). Other examples are also possible.

In some embodiments, further functionality may be used after loading in throttle mode. For example, a touch input or touch gesture may be used to provide various throttle functionality (or robot functionality). As described previously, the operational mode may define both (i) how the controller 300 behaves (e.g., whether it has a sonic function, detents, return-to-center, and/or other functionality) and (ii) how user input (e.g., rotation of knob and touch gestures) should be interpreted and translated into control signals, e.g., robot control signals.

In some embodiments, the throttle mode may further provide cruise control functionality via the controller 300. For example, after engaging in a throttle grip in a horizontal position, the knob 312 may be rotated to simulate an open throttle and a thumb tap (or other touch input) may indicate cruise control engagement. The control system may set a cruise control knob position when the thumb tap occurs and be configured to operate in the throttle mode by keeping the knob 312 at substantially the cruise control knob position until the cruise control is disengaged (e.g., by another touch input).

In another aspect, certain touch gestures may indicate other functionality while in throttle mode. For example, the hand-holdable controller may implement a braking functionality while in throttle mode after certain touch gestures (e.g., quickly tapping all four fingers on the surface of the knob 312 while in a throttle grip or applying over a threshold amount of pressure on the surface of the knob 312). Because the operational modes are programmable, numerous other examples are possible.

III. ILLUSTRATIVE METHODS

Figure 6:
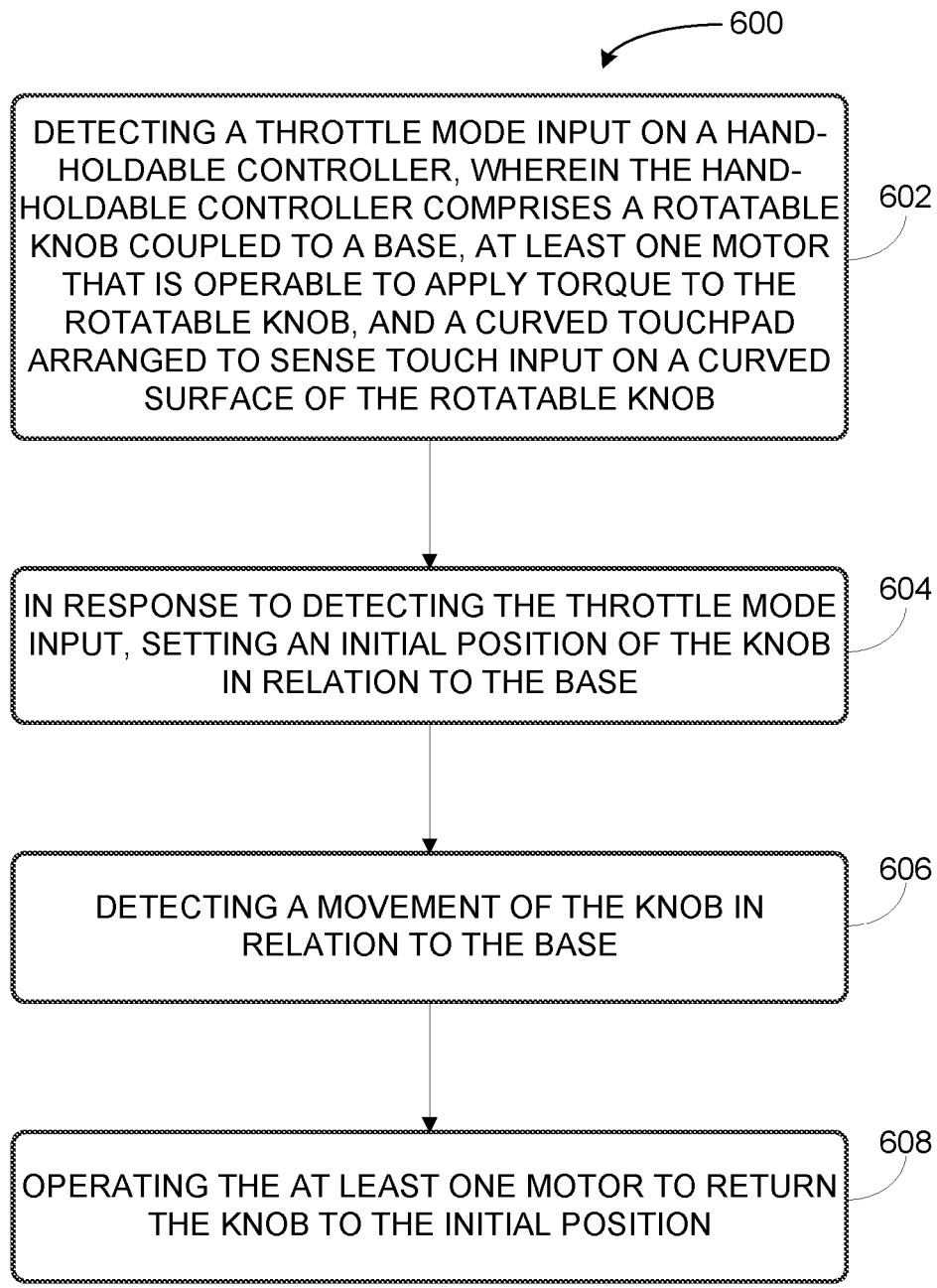
FIG. 6 is an example flowchart for simulating throttle functionality for the example hand-holdable controller, according to example implementations.

FIG. 6 is a flowchart illustrating a method 600, according to an example implementation. In particular, method 600 may be implemented to simulate throttle functionality on a hand-holdable controller.

Method 600 shown in FIG. 6 (and other processes and methods disclosed herein) presents a method that can be implemented within an arrangement involving, for example, the robotic system 100, the robotic arm 118, the computing device 200, tablet 216, hand-holdable controller 300, example hand-holdable controller 320 and/or within the arrangement 400 shown in FIG. 4 (or more particularly by one or more components or subsystems thereof, such as by a processor and a non-transitory computer-readable medium having instructions that are executable to cause the device to perform functions described herein). Additionally or alternatively, method 600 may be implemented within any other arrangements and systems.

Method 600 and other processes and methods disclosed herein may include one or more operations, functions, or actions as illustrated by one or more of blocks 602-608. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves detecting throttle mode input on a hand-holdable controller, wherein the hand-holdable controller comprises a rotatable knob coupled to a base, at least one motor that is operable to apply torque-generating force to the rotatable knob, and a curved touchpad arranged to sense touch input on a curved surface of the rotatable knob.

In an example implementation, throttle mode input data may be received by computing device 200 (or robotic system 100) from hand-holdable controller 300 (e.g., via communication links 402A or 402C). The throttle mode input data may represent touch data received via touch sensors 316 of the hand-holdable controller 300 and/or sensor data received via sensors 314 of the hand-holdable controller 300. Moreover, this throttle mode input data may affect one or more aspects of the computing device 200 as previously disclosed.

Additionally or alternatively, the computing device 200 may receive input data representing a rotation of the knob 312 and process and interpret this input data into one or more operations that should be carried out by one or more components of the robotic system 100. The computing device 200 may then send commands to the robotic system 100 (e.g., via communication link 402B) and the robotic system 100 may carry out these operations based on the received commands.

Various implementations may generally be discussed below in the context of the hand-holdable controller 300 providing functionality of the robotic system 100 by way of the computing device 200 interpreting input data received from the hand-holdable controller 300. However, other implementations may also be possible. For instance, the hand-holdable controller 300 may control the robotic system 100 directly (e.g., via communication link 402C). As such, any functionality of computing device 200 described herein may be incorporated within the hand-holdable controller 300. Other examples and implementations may also be possible.

In a further aspect, the received input data may be in the form of computer-readable data packets, among other possible forms. Additionally, the input data may be received continuously (e.g., in real-time) or may be received from time-to-time (e.g., periodically). Further, the computing device 200 may receive input data in several separate data packets or in a single data packet. For instance, data representing rotation of the knob 312 and/or touch data may each be received via separate data packets or may all be received via the same data packet, among others. Once the input data is received, some or all of the input data may be stored in a data storage (e.g., data storage 204) and/or processed (e.g., using processors 202) to provide the functionality further discussed below.

At block 604, method 600 involves, in response to detecting the throttle mode input, setting an initial position of the knob in relation to the base. The hand-holdable controller may perform a function to indicate the initial position has been set. For example, a sonic output (i.e., oscillating torque of the motor to produce a sound) may be used for a short period of time after the initial position has been set.

In an example implementation, operating mode data refers to an operating mode of the motor (e.g., motor 318) of the hand-holdable controller 300. Broadly, operating modes vary the speed and/or resistance of the control knob and can be used individually or in combination with other operating modes. For example, in various operating modes, the motor can (i) vary the turning resistance of the knob (e.g., how hard it is to twist), (ii) rotate the control knob, (iii) prevent rotation of the knob, (iv) vary the speed at which the knob can turn, (v) vary the force that is required from the user to rotate the knob, (vi) vary the resistance of the knob to simulate detents (or ticks), (vii) to provide a return to center function (e.g., the motor is operable to return the knob to a certain position anytime a user releases the knob), (viii) to allow for continuous spin (e.g., the motor is set to operate in a free spin mode), (ix) to limit rotation (e.g., the motor is set to limit rotation to within plus or minus 45 degrees from a center point), and/or (x) increase or decrease resistance the further the knob is rotated in one direction (e.g., progressively increasing resistance as the knob is rotated may create the feeling of tension increasing as a component is wound up or a limit is reached).

Other operating modes (and combinations of operating modes) are possible. For example, the hand-holdable controller may be configured to provide a variable resistance through customizable arc sizes of various sizes. For example, a full (or partial) rotation of the knob could be divided into a variable number of arcs, and each arc could be of various sizes. Each of the variable number of arcs could be defined to have a specific feel (e.g., one or more operating modes, such as resistance levels, speed, detents or no detents, etc.).

In an example implementation, the computing device 200 may send (e.g., via communication link 402A) preconfigured or configurable throttle mode data for the knob 312 to the hand-holdable controller 300. The throttle mode data may be a pre-configured list, may be input by a user, may be loaded onto the computing device 200 (e.g., from an external memory storage device), and/or may otherwise be input into the computing device 200.

At block 606, method 600 involves detecting a movement of the knob 312 in relation to the base 310. In some example implementations, the sensor(s) 314 may include a position sensor, such as a Hall effect sensor, that can determine the rotational position of the knob 312 relative to the base 310.

At block 608, method 600 involves operating the at least one motor to apply torque-generating force to the knob 312 to return the knob 312 to the initial position. Torque may be applied immediately after detecting a movement of the knob 312, after a period of time, when the throttle grip is released, when a touch sensor is disengaged, or upon the occurrence of some other triggering event.

Further, some form of feedback may be provided upon configuring the computing device 200 to operate the particular component. In one example, the computing device 200 may provide visual feedback (e.g., via display 212) indicating the particular component being controlled. In another example, the computing device 200 may send a command to the hand-holdable controller 300 to cause vibrational feedback (e.g., provided by the motor 318) such that a user holding the hand-holdable controller 300 can feel the vibration. In yet another example, visual feedback may be provided by the particular component of the robotic system 100. For instance, an LED that is coupled to the particular component may light up when the computing device 200 is set to operate the particular component. Other examples may also be possible.

In an example implementation, the input data received by the computing device 200 may be interpreted, by the computing device 200, to correspond to a particular operation of the component that is based on (i) rotation of the knob and (ii) touch data received from the touch sensors during the rotation of the knob.

The throttle mode functionality of the hand-holdable controller 300 may dynamically change based on dynamically changing touch data. For example, as the hand-holdable controller 300 dynamically detects a change in touch data (e.g., a grip moving up or down on the controller or from a full throttle grip with all four fingers to a partial throttle grip with less than four fingers), the output commands may also dynamically change (e.g., from a coarse adjustment with a full throttle grip to a medium adjustment with a partial throttle grip or even to a fine adjustment with a fingertip grip). Other examples may also be possible.

In the case of a power-off event of a system such as the hand-holdable controller 300, the computing device 200 or the hand-holdable controller 300 may store information related to a most recent configuration. For instance, if the hand-holdable controller 300 is operating in a throttle mode with particular functionality at the time of a power-off event, the hand-holdable controller 300 (or the computing device 200) may store information related to the fact that this particular throttle mode was the most recent mode prior to the power-off event and/or may store information related to characteristics of the particular operating mode, such as position of the knob 312. Subsequently, the hand-holdable controller 300 (or other component) can detect a power-on event. Upon such detection, the hand-holdable controller 300 may reconfigure to operate using the most recent operating mode. For instance, the hand-holdable controller 300 may reconfigure to operate in the most recent operating mode prior to the power-off event. Other instances may also be possible.

IV. ADDITIONAL FEATURES

While control of the robotic system 100 was discussed above generally in the context of controlling joints of the robotic system 100, such discussion should not be seen as limiting as the example implementations discussed herein may be used for control of a variety of different robotic system 100 components, as well as components/aspects of other devices and machines. In one example, rotation of the knob 312 may allow for control of an internal combustion engine, an electric motor, a servomotor, or another component which may be usefully controlled by a rotary twist-grip throttle mechanism. In another example, rotation of the knob 312 may allow for control of volume output of a speaker (e.g., a speaker incorporated within the robotic system 100). In another example, rotation of the knob 312 may allow for control of light output from a light source (e.g., a light source incorporated within the robotic system 100). In yet another example, rotation of the knob 312 may allow for control of movement/functionality of an end effector of the robotic system 100. Other examples may also be possible.

V. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

I claim:

1. A system configured to operate a robotic device, the system comprising:
   a rotatable knob coupled to a base;
   at least one motor that is operable to apply a torque-generating force to the rotatable knob;
   a curved touchpad comprising one or more touch sensors arranged to sense touch input on a curved surface of the rotatable knob; and
   a control system configured to:
      detect, based at least in part on touch data from the curved touchpad, a throttle mode input; and
      in response to the throttle mode input, operate the at least one motor to affect the rotation of the rotatable knob to simulate a throttle.

2. The system of claim 1, wherein the throttle mode input further comprises inertial data from one or more sensors.

3. The system of claim 1, wherein operation in the throttle mode allows for rotation of the rotatable knob between: (i) an initial position and (ii) a stop position.

4. The system of claim 1, wherein operation in the throttle mode further comprises operating the at least one motor to apply torque-generating force to the rotatable knob in accordance with a return-to-center function for the rotatable knob.

5. The system of claim 3, wherein the control system is further configured to apply a sonic output, by oscillating torque through the motor, at the initial position and the stop position.

6. The system of claim 3, wherein rotation from the initial position to the stop position is in a first direction, and wherein operation in the throttle mode further allows for rotation of the rotatable knob in a second direction from the initial position to a second stop position, wherein the second direction is opposite of the first direction.

7. The system of claim 1, wherein the control system is further configured to (i) set an initial position upon detecting the throttle mode input, (ii) detect a movement from the initial position, and (iii) in response to detecting the movement from the initial position, apply torque-generating force to the rotatable knob to return the rotatable knob to the initial position.

8. The system of claim 1, wherein the control system is further configured to apply a force-derivative torque to the knob in response to an applied knob force, wherein the force-derivative torque is related to the derivative of the applied knob force.

9. The system of claim 1, wherein the control system is further configured to apply a velocity-dependent damping torque to the knob in response to an applied knob force, wherein the velocity-dependent damping torque is related to the velocity of the applied knob force.

10. The system of claim 9, wherein the velocity-dependent damping torque further comprises a viscous damping factor.

11. The system of claim 1, wherein the control system is further configured to apply a sonic output by oscillating torque through the motor.

12. A method comprising:
- receiving touch data from a curved touchpad comprising one or more touch sensors, wherein the curved touchpad is arranged on a curved surface of a rotatable knob, wherein a control device comprises the rotatable knob coupled to a base, at least one motor that is operable to apply torque-generating force to the rotatable knob, and the curved touchpad;
- detecting, based at least in part on the touch data, a throttle mode input; and
- in response to the throttle mode input, operating the control device in a throttle mode, wherein operating the control device in a throttle mode comprise operating at least one motor to affect the rotation of the rotatable knob to simulate a throttle.

13. The method of claim 12, wherein operating the control device in the throttle mode further comprises applying a return-to-center function to control rotation of the rotatable knob.

14. The method of claim 12, wherein detecting the throttle mode input further comprises detecting inertial data from one or more inertial sensors.

15. The method of claim 14, wherein the touch data indicates a throttle grip on the rotatable knob.

16. The method of claim 12, wherein operation in the throttle mode allows for rotation of the rotatable knob between: (i) an initial position and (ii) a stop position.

17. A non-transitory computer readable medium comprising program instructions executable by a processor to cause a computing device to perform operation comprising:
- receiving touch data from a curved touchpad comprising one or more touch sensors, wherein the curved touchpad is arranged on a curved surface of a rotatable knob, wherein a control device comprises the rotatable knob coupled to a base, at least one motor that is operable to apply torque-generating force to the rotatable knob, and the curved touchpad;
- detecting, based at least in part on the touch data, a throttle mode input; and
- in response to the throttle mode input, operating the control device in a throttle mode, wherein operating the control device in a throttle mode comprise operating at least one motor to affect the rotation of the rotatable knob to simulate a throttle.

18. The non-transitory computer readable medium of claim 17, wherein causing the control device to operate in the throttle mode further comprise operating the at least one motor to according to a return-to-center function.

19. The non-transitory computer readable medium of claim 17, wherein detecting the throttle mode input further comprises detecting inertial data from one or more inertial sensors.

20. The non-transitory computer readable medium of claim 17, wherein the touch data indicates a throttle grip on the rotatable knob.

* * * * *